March 20, 1951  R. H. WHISLER, JR  2,546,051
SHOCK ABSORBER
Filed Aug. 21, 1950  3 Sheets-Sheet 1
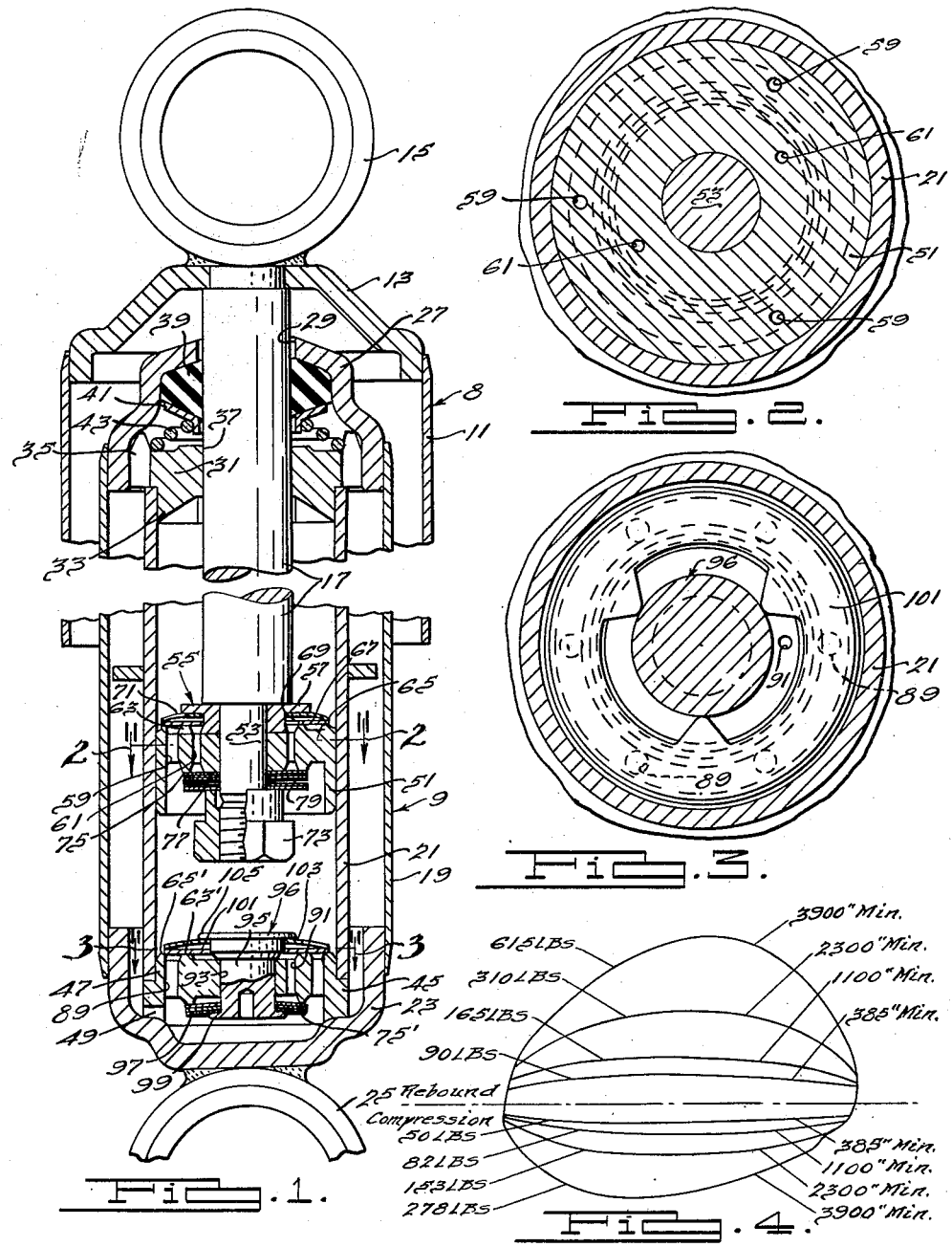
INVENTOR.
Ralph H. Whisler, Jr.
BY
Harness, Dickey & Pierce
ATTORNEYS.

March 20, 1951 R. H. WHISLER, JR 2,546,051
SHOCK ABSORBER
Filed Aug. 21, 1950 3 Sheets-Sheet 2
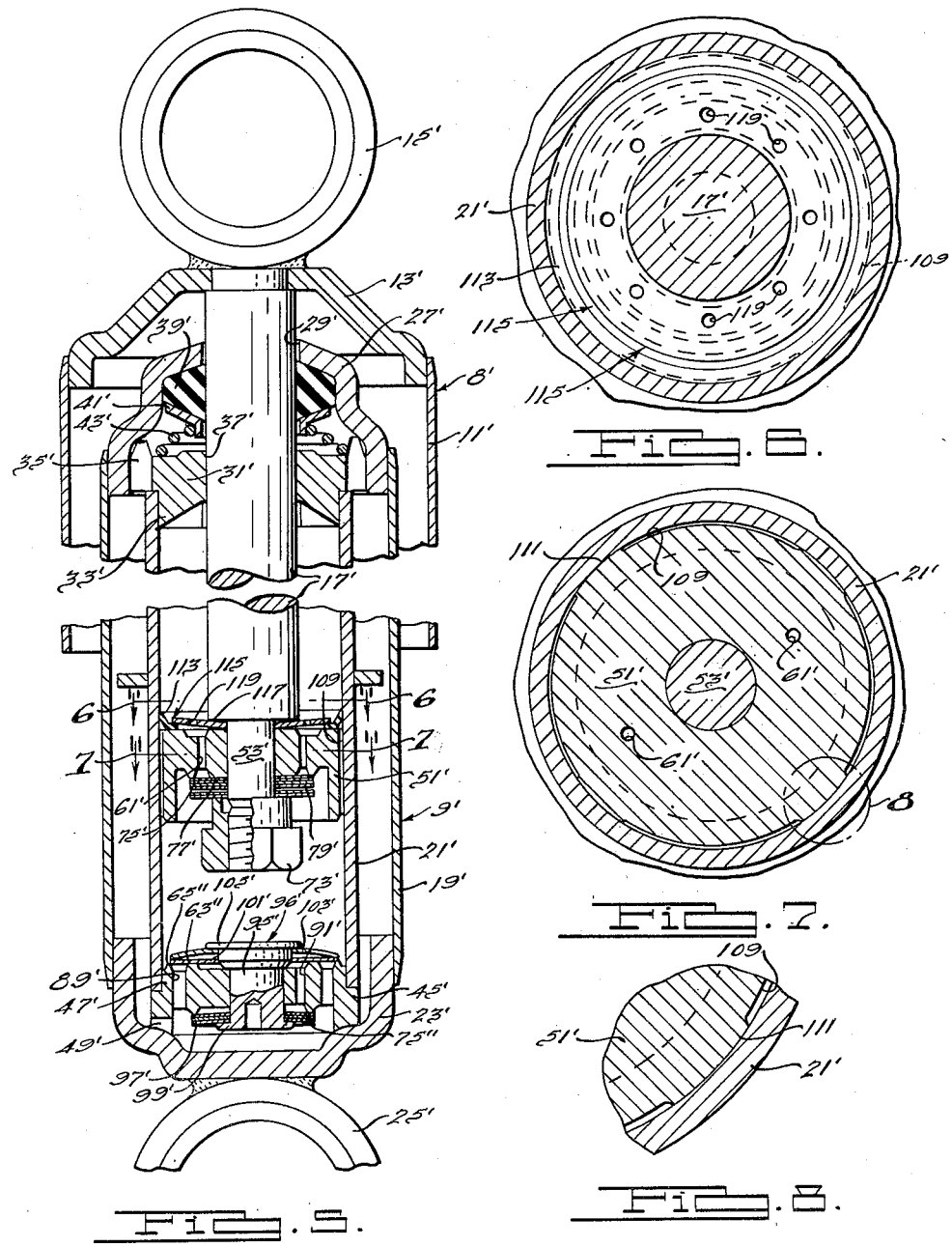
INVENTOR.
Ralph H. Whisler, Jr.
BY
Harness, Dickey & Pierce.
ATTORNEYS.

March 20, 1951 R. H. WHISLER, JR 2,546,051
SHOCK ABSORBER

Filed Aug. 21, 1950 3 Sheets-Sheet 3

INVENTOR.
Ralph H. Whisler, Jr.
BY
Harness, Dickey & Pierce
ATTORNEYS.

Patented Mar. 20, 1951

2,546,051

UNITED STATES PATENT OFFICE 2,546,051

SHOCK ABSORBER

Ralph H. Whisler, Jr., Monroe, Mich., assignor to Patent Development Company, Monroe, Mich., a partnership Application August 21, 1950, Serial No. 180,539

13 Claims. (Cl. 188—88)

This invention relates to shock absorbers of the hydraulic direct-acting type, such as shown in the copending patent application of Brouwer D. McIntyre et al. for Shock Absorber Construction, Serial No. 171,472, filed June 30, 1950, and is a continuation in part of applicant's copending application, Serial No. 136,949, filed January 5, 1950, now abandoned.

The shock absorber illustrated and described in the aforementioned McIntyre et al. copending application is of the type having a restricted opening in the piston and a restricted opening in the compression base valve at one end of the shock absorber pressure cylinder. The restricted opening in the piston has one end thereof normally closed by means of a valve disk which is actuatable by a predetermined fluid pressure to permit fluid to flow from the upper portion of the pressure cylinder to the opposite side of the piston, adjacent the base compression valve. The base compression valve restricted opening is likewise normally closed by a valve disk which is actuatable to permit fluid to flow from the pressure cylinder to the reserve chamber. Due to this structure, the shock absorber shown in the copending application is provided with both pressure and velocity responsive means for controlling the flow of fluid from the pressure cylinder to the reserve chamber and from the upper portion of the pressure cylinder to the lower portion thereof. That is, on rebound stroke of the shock absorber, when the piston moves away from the base valve, fluid will flow through the piston restricted passageway and when a predetermined fluid pressure has been built up the valve disk will be actuated to permit the fluid to flow to the opposite side of the pressure cylinder. At relatively low velocities very little resistance to the flow of fluid is occasioned by the restricted size of the piston opening. However, as the velocity of the piston increases, the opening will provide increasingly higher resistance to the flow of fluid therethrough and in effect forms velocity responsive means for controlling the flow of fluid through the piston at high velocities. The same is true of the base valve construction on the compression stroke, that is, upon movement of the piston toward the base valve assembly.

The advantages of this type of shock absorber are fully set forth in the McIntyre et al. copending application. It has, however, been found that even if the base valve assembly is provided with pressure and velocity responsive means for controlling the flow of fluid from the pressure cylinder to the reserve chamber and thus providing compression control for the shock absorber, the piston is in effect doing substantially no work on the compression stroke, and is therefore providing practically none of the shock absorber compression control. If the piston is constructed so that it will provide a substantial part of the shock absorber compression control, then the size of the shock absorber, that is the diameter of the pressure cylinder bore, can be materially lessened, if the desired rebound control is not such as to prevent it, due to the fact that the piston is cooperating with the base valve to provide the necessary control. As a result a smaller shock absorber can be used to perform the same amount of work that a larger shock absorber, in which the base valve alone does all the work, is capable of doing.

By obtaining as much work as possible from the piston and fluid passing therethrough, internal operating pressures during the compression stroke of the shock absorber are reduced and thus the operating life of the shock absorber is increased and stroke loss or lag due to aeration of the shock absorber fluid is decreased. Still further, this type of shock absorber construction reduces control losses in the shock absorber due to wear and valve spring set. The obtainance of as much work as possible from the piston and fluid passing therethrough may be obtained in more than one way. It may be obtained by restricting both the piston compression passages as well as the compression passage or passages in the base valve and by using in conjunction with these passages pressure responsive means. In this type of construction the pressure responsive means act to provide the primary control during low piston velocities and the restricted passages act to provide the primary control at high piston velocities due to their orifice effect. The results of this invention can also be achieved by providing a piston having restricted compression passages therein, while the base valve passages may be either completely unrestricted or only restricted to a limited extent. In such cases, the pressure responsive valve means in the base valve must be balanced or correlated with the piston assembly so that the piston assembly will not develop internal pressures, at any piston velocities developed when the shock absorber is mounted on a vehicle or the like, which are greater than the pressure produced by the base valve assembly at the same piston velocity. Thus, the results of this invention may be achieved by only restricting the piston passages and by properly balancing or correlating the base valve assembly relative thereto; but, in any event, the piston passages must be restricted in the manner which will be hereinafter set forth, and the base valve must be constructed so as to provide no less resistance to fluid flow therethrough than the piston assembly, at any operating velocity, as brought out above.

The applicant, therefore, has devised a shock absorber in which better compression control is obtained than in any shock absorber heretofore known, without at the same time imparting harshness or over-rigidity to the shock absorber action. While shock absorber manufacturers have for years desired to better the compression control of shock absorbers, they have not found a way to do so without providing either an extremely large shock absorber or one which, when the shock absorber was mounted on an automotive vehicle, or the like, would impart harshness to the vehicle ride. As has been fully pointed out in the aforementioned Mc Intyre et al. copending application, valve disks or pressure responsive means alone are not sufficient in order to obtain the ultimate in shock absorber ride control for vehicles, and it was found that by using relatively flexible valve disks on the piston and base valve assemblies, for controlling the flow of fluid past these assemblies, the ultimate in vehicle ride conditions on smooth surfaces such as boulevards could be achieved. Also, by providing restricted openings or velocity responsive means for controlling the flow of fluid past the piston at relatively high piston velocities, such as would be occasioned when a vehicle is traveling over irregular road surfaces, the ultimate in vehicle ride characteristics would be obtained under these conditions, without in any way adversely affecting boulevard ride characteristics. Therefore, by putting the shock absorber piston assembly to work during the compression stroke of the shock absorber, the ultimate in compression control is obtained, and the size of the shock absorber can be reduced below that which has been heretofore thought possible for performing the same amount of work and providing the necessary control.

It is, therefore, an object of this invention to provide a shock absorber of the aforementioned type, having a variable rate resistance; that is, one in which the resistance for one range of piston velocities can be varied without appreciably affecting the resistance in the other range of piston velocities.

It is a still further object of this invention to provide a shock absorber of the aforementioned type, in which at high piston velocities fluid pressure differential acts on the full area of the piston, less the area of the piston rod, so that a smaller shock absorber than has been heretofore possible may be produced, which will perform the same amount of work and provide as effective control during the compression stroke as heretofore known larger shock absorbers.

It is a still further object of this invention to provide a shock absorber of the aforementioned type, which when mounted on a vehicle, will produce the ultimate in vehicle riding conditions both on smooth and irregular road surfaces.

It is a still further object of this invention to provide a shock absorber of the aforementioned type which is relatively simple and inexpensive to manufacture, and extremely durable and efficient in use.

These and other objects of this invention will become apparent from the following detailed description, taken in conjunction with the accompanying drawings, in which:

Figure 1 is a longitudinal sectional view of one embodiment of the shock absorber of this invention;

Fig. 2 is an enlarged sectional view of the structure illustrated in Fig. 1, taken along the line 2—2 thereof;

Fig. 3 is an enlarged sectional view of the structure illustrated in Fig. 1, taken along the line 3—3 thereof;

Fig. 4 is a graphic representation of the resistances provided by a shock absorber of the type illustrated in Fig. 1, at different piston velocities;

Fig. 5 is a longitudinal sectional view, similar to Fig. 1, of a further embodiment of this invention;

Fig. 6 is an enlarged sectional view of the structure illustrated in Fig. 5, taken along the line 6—6 thereof;

Fig. 7 is an enlarged sectional view of the structure illustrated in Fig. 5, taken along the line 7—7 thereof;

Fig. 8 is an enlarged sectional view of the structure within the circle 8 of Fig. 7;

Figure 9:
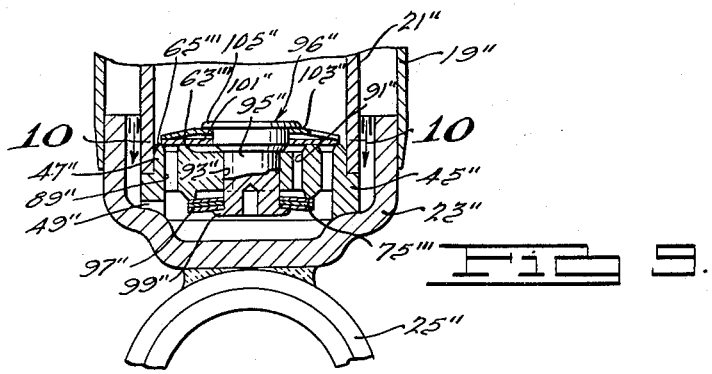
Fig. 9 is a fragmentary longitudinal sectional view similar to Fig. 1, of a base valve assembly and adjacent shock absorber parts of a further embodiment of the invention.

Referring now to the drawings, and more particularly to Figs. 1-3 inclusive, it will be seen that the shock absorber includes telescoping sections 8 and 9, which are movable longitudinally with respect to each other when the shock absorber is attached between the sprung and unsprung portions of a vehicle, or the like. The section 8 includes a tubular member 11, having an end cap 13 secured to the upper end thereof. The end cap 13 is adapted to be connected to the sprung portion of a vehicle, by means of a ringlike attaching element 15. A piston rod 17 has its upper end rigidly connected to the under side of the base portion of the cap 13 and depends therefrom into the section 9, as will be hereinafter brought out. The section 9 includes a tubular member 19, which is concentric with the tubular member 11 and partially surrounded thereby, and which forms a fluid reservoir chamber for the shock absorber. A second tubular member 21, is concentrically disposed within the reserve tube 19, and forms a pressure cylinder within which the main operating parts of the shock absorber are disposed. The lower end of the reserve tube 19 is closed by means of an end cap 23 which is adapted to be connected to the unsprung portion of a vehicle by any suitable means, such as a ringlike attaching member 25. The upper end of the reserve tube 19 is closed by means of an end cap 27 which is provided with a central aperture 29, in the base portion thereof, through which the piston rod 17 extends.

The upper end of the pressure cylinder 21 is closed by means of a head or piston rod guide member 31, which is provided with a reduced portion 33, which fits into the upper end of the pressure cylinder 21. The rod guide 31 is provided adjacent the outer periphery thereof, with a plurality of circumferentially spaced upwardly extending projections 35, which engage the end cap 27 and thereby lock the rod guide against movement with respect to the pressure tube 21, when the shock absorber is assembled. The rod guide 31 is provided with a central aperture 37, through which the piston rod 17 extends. A rubber seal 39 surrounds the piston rod 17 and is confined within the upper portion of the end cap 27 by means of a retainer element 41 and a spring 43, the lowermost convolution of which seats upon the upper face of the rod guide 31, within the confines of the projections 35.

The lower end of the pressure cylinder 21 is closed by means of a base compression valve assembly having a valve body 45. The cylinder end or valve body 45 is provided on the outer periphery thereof with a reduced portion 47, over which the lower end of the pressure tube 21 is fitted. The bottom face of the valve body 45 abuts the end cap 23, so that the valve body is locked against movement between the end cap and the pressure tube 21. The valve body 45 is provided adjacent the lower end thereof with a plurality of circumferentially spaced passageways 49, which communicate the reserve chamber 19 with the under side of the central portion of the valve body 45.

The reserve tube or chamber 19 is adapted to contain a reserve supply of hydraulic medium, in addition to that which is disposed in the pressure cylinder 21, and the fluid in the pressure cylinder is displaced in dependence upon relative movement of the shock absorber sections 8 and 9 by means of a piston 51, which is connected to the lower end of the piston rod 17 for reciprocation within the pressure cylinder upon relative movement of the shock absorber sections. The lower end of the piston rod 17 is reduced in diameter at 53 to extend through the piston 51. A support washer 55, having an annular flange 57 on the upper end thereof, abuts the shoulder formed at the upper end of the reduced piston rod portion 53, and has its lower end disposed in a recess in the upper face of the piston 51, adjacent the piston rod reduced portion 53.

The piston 51 is provided with an outer set of circumferentially spaced, restricted passageways 59 and a pair of opposed restricted passageways 61, which are disposed radially inwardly from the outer set of passageways 59. Three passageways 59 are illustrated as comprising the outer set of passageways for the piston, for reasons which will hereinafter appear. The upper face of the piston 51 is provided with a circumferential upwardly projecting rim or land 63 between the inner and outer sets of passageways 59 and 61. A second upwardly projecting land or rim 65 is provided on the upper surface of the piston 51 adjacent the outer periphery thereof. A disk type valve 67 is seated upon the upper faces of annular lands 63 and 65 and is of the type illustrated in Fig. 3. The valve 67 closes off the upper ends of the outer set of passageways 59 and is provided with openings 69 above the inner set of passageways 61, so as not to affect the flow of fluid through these passageways. The disk valve 67 is resiliently held in engagement with the upper face of the piston 51 by means of a star shaped spring 71. The spring 71 is slidably supported on the shank portion of the support washer 55, and the annular flange of the support washer engages the inner peripheral portion of the star spring so as to preload the disk valve 67 through the spring 71, a predetermined amount. The disk valve 67 thus lies flat on the piston lands 63 and 65 and is not clamped against the lands but rather is free to be lifted off of its seat against the action of the spring 71.

The piston 51 is locked on the reduced piston rod portion 53, with its upper face engaging the lower face of the support washer 55, by means of a nut 73, which is threaded on the lower end of the piston rod reduced portion 53. The bottom face of the piston 51 is provided, in addition to a downwardly projecting land 75, which corresponds to the land 63 previously described, with a downwardly projecting land 77, adjacent the piston rod reduced portion 53. A laminated disk valve 79 abuts the bottom faces of lands 75 and 77, so as to normally close off the lower end of the two inner passageways 61, and the nut 73 engages the bottom face of the disk valve 79 so as to resiliently maintain the disk valve in position to normally close off the lower ends of the two piston openings 61.

The compression base valve body 45 is provided with an outer set of circumferentially spaced passageways 89 and a single inner passageway 91. While more than one passageway 91 may be provided, if desired, the shock absorber illustrated in Figs. 1–3 is provided with only one passageway, so that a ratio of three to one between the piston passageways 59 and the base valve passageway 91 is provided. That is to say, the total flow capacity of the three piston passageways 59 is three times as great as the flow capacity of the valve passageway 91. The three to one ratio is arrived at from the fact that the area of the rebound chamber i. e. the area of the pressure cylinder bore less the area of the operating rod 17, is substantially three times the area of the operating rod, so that when the piston 51 moves toward the base valve 45 during the shock absorber compression stroke, as will hereinafter more fully appear, three times as much fluid will flow up through the piston passageways 59, as through the base valve passageway 91, so as to continually maintain the upper portion of the pressure cylinder, between the rod guide 33 and the piston 51, completely filled with fluid at all times, thus preventing, or at least materially reducing, any gas or air pockets or vapor from being formed in the upper portion of the pressure cylinder, which would adversely affect the operation of the shock absorber. At the same time the piston passageways 59 and 61 are of a relatively small size, so as to provide resistance to the flow of fluid therethrough at high piston velocities, as will more fully hereinafter appear.

The upper and lower faces of the valve body 45 are provided with lands in the same manner as the upper and lower faces of the piston, so that the lands thereof are indicated by primed numbers corresponding to like numbers in the piston construction. The base valve body 45 is provided with a central aperture 93, through which is extended the shank portion 95 of a partially hollow rivet 96. The lower end of the valve body passageway 91 is normally closed by means of a laminated disk valve 97 which has the outer periphery seated against the bottom face of the land 75' and the inner periphery held in engagement with the lower face of the valve body by a spun over portion 99 on the lower end of the rivet shank 95. The outer periphery of the laminated disk valves 97 can thus be unseated or moved away from the lower end of the valve body passageway 91 by a predetermined fluid pressure.

The upper ends of the base valve passageways 89 are resiliently closed by means of a disk valve 101 which corresponds to the disk valve 67 used in the piston construction. A star spring 103 holds the disk valve 101 in its closed position, in the same manner as previously described in conjunction with the piston. The rivet 95 is formed with an annular flange or head 105 in the upper end thereof, which engages the star spring 103 so as to load the disk valve 101 by a predetermined amount in the same manner as previously described.

It should at this time be pointed out that the two inner passageways 61 in the piston 51, and the single inner passageway 91 in the base valve body 45, are of such a size as to offer only a minimum of resistance to the flow of fluid therethrough when the shock absorber is being actuated at a relatively low velocity such as 385 inches per minute or less, but will offer increasingly higher resistance to the flow of fluid therethrough after the valve disks 79 and 97 have been opened, as the cycle of operation of the shock absorber increases, as will clearly appear hereinafter.

In operation, when the piston 51 travels downwardly the fluid in the pressure cylinder 21, below the piston 51, passes upwardly through the outer piston passageways 59 and the pressure of the fluid moves the disk valve 67 off its seat on the lands 63 and 65 against the action of the star spring 71 and enables fluid to flow into the upper portion of the cylinder above the piston. Due to the fact that the piston rod 17 occupies a portion of the cylinder 21 above the piston, the available space in this portion of the cylinder is less in volume than the space below the piston. Thus, as the piston continues to move downwardly fluid will be displaced by the rod through the opening 91 in the base valve and will flow into the reserve chamber 19. In order to prevent cavitation in the shock absorber, it is extremely important that the upper portion of the pressure cylinder, above the piston, be filled with fluid at all times so that gas or air pockets or voids will not form. As the ratio between the area of the cylinder bore less the area of the operating rod, and the area of the rod 17 is approximately three to one in the shock absorber illustrated, three passageways 59 are provided in the piston as compared with one passageway 91 in the base valve so that the total area of the three passageways 59 is three times the area of the passageway 91. Therefore, a greater volume of fluid will flow upwardly through the passages 59 to the upper portion of the pressure cylinder so as to maintain the same in a filled condition. The resistance to the flow of fluid offered by the piston valve disk 69 and star spring 71 is less than the resistance offered by the base valve laminated disk 97, so that the fluid will flow upwardly through the piston before it flows downwardly through the base valve opening 91. As the piston continues to move downwardly sufficient pressure is built up against the disk valve 97 of the base valve assembly to unseat or move the latter off its seat on the land 75' and to permit the displaced fluid to flow into the reserve chamber 19 through the opening 91. However, as will hereinafter appear, if the piston is operating at high velocities, resistance to the flow of fluid through the passages 59 and 91 will be set up by the passages themselves for controlling the flow of fluid to the upper portion of the cylinder and to the reserve chamber, in addition to the control provided by the valve disks.

When the piston 51 moves in an upward direction in the pressure cylinder 21, the fluid under pressure passes through the two piston passageways 61 and acts against the laminated disk valve 79 to force the same off its seat on the land 75, and permits the fluid to flow from the upper portion of the cylinder into the portion of the cylinder below the piston. As the piston 51 travels upwardly in the cylinder, the piston rod 17 moves out of the cylinder and, therefore, it is necessary to replenish the lower portion of the cylinder with the fluid. This additional supply of fluid is supplied from the reserve tube 19, through the base valve passageways 89, which fluid unseats the disk valve 101 against the action of the star spring 103, which opens relatively freely so that very little or no resistance is offered to the flow of fluid from the reserve tube, thus replenishing the supply of fluid in the lower portion of the cylinder. Again, it must be pointed out that the fluid flowing from the upper portion of the cylinder through the two piston passageways 61 will be controlled primarily by the pressure responsive disk valve 77, during low piston and fluid velocities, and by the disk valve 77 and the additional resistance set up in the passageways 61 themselves when the shock absorber is operating at high piston and fluid velocities.

Referring now to Fig. 4, wherein a graphic resistance curve is shown for the shock absorber of this invention, it will be seen that when the piston is moving upwardly at a velocity of approximately 385 inches per minute, the piston resistance to fluid flow from the upper side to the lower side thereof is approximately 90 pounds. When the piston velocity increases to 1100 inches per minute, the resistance is increased to 165 pounds. When the piston velocity is increased to 2300 inches per minute the piston resistance increases to 310 pounds, and when the piston velocity reaches approximately 3900 inches per minute the piston resistance is increased to 615 pounds. With the construction of this invention, due to the use of valve disks, resistance is still obtained in boulevard riding, as indicated by the generally straight line nose of each curve, and the necessary resistance for proper control during rough riding is obtained by the use of the restricted passageways. When the piston moves downwardly at a velocity of approximately 385 inches per minute, the total resistance offered by the base compression valve and the piston is approximately 50 pounds. When the piston velocity increases to 1100 inches per minute the total resistance is increased to 82 pounds, and when the piston velocity reaches 2300 inches per minute the total compression resistance is increased to 153 pounds. When the piston velocity reaches 3900 inches per minute the total compression resistance is increased to 278 pounds. Of course, as the velocity continues to increase the resistance will greatly increase, and on "washboard" roads the piston velocity may reach 6000 inches per minute. It will thus be seen that with the construction of this invention, wherein restricted passageways 61 and 59 are provided in the piston for controlling rebound and compression strokes, respectively, and a restricted passageway 91 is provided in the base compression valve for cooperating with the piston compression passageways 59, the resistance to the flow of fluid through the piston and base valve at high piston velocities is a great deal higher than that obtained with a conventional type of shock absorber wherein orifice resistance is removed as much as possible. Also, it will be appreciated that by restricting the sizes of the passageways smooth riding characteristics for a vehicle on which the shock absorber is mounted will not be impaired as the passageways will offer only a minimum of resistance to the flow of fluid during low piston velocities.

As a result of actual tests, run on a shock absorber of this invention, it has been found that at low velocities of around 385 inches per minute there was practically no compression control caused by the piston, and that the compression control was primarily achieved through the base valve structure. When the piston velocity was increased to 1100 inches per minute, only 16% of the total compression control was caused by the piston. However, as the velocity of the piston increases, the percentage of the total compression control contributed by the piston likewise increases, so that at 2300 inches per minute the piston provides 35% of the compression control, and at 3900 inches per minute it provides 48% of the total compression control. It will thus be appreciated that the restricted passageways 59 in the piston provide a substantial portion of the compression control of the shock absorber and cooperate with the base valve to provide more efficient control and to enable the use of a smaller shock absorber from which the same amount of work may be achieved as from heretofore known conventional shock absorbers. Thus, while a relatively light disk valve 67 is used on the compression side of the piston, so as not to impart any harshness to the vehicle ride on relatively smooth pavement, the restricted passageways 59 provide the necessary control at high piston velocities to give the ultimate in vehicle ride characteristics on irregular road surfaces on the compression stroke of the piston. It will, of course, be understood that the ratio of three to one between the piston passageways 59 and base valve passageway 91 may be varied in accordance with variations in the ratio between the area of any given pressure cylinder less the area of the operating rod, and the area of the rod, and it will also be understood that the three to one ratio is only a minimum to insure proper filling of the pressure cylinder, and that more openings may be provided in the piston if less compression resistance is desired, as heretofore described. In any case, the size of the base valve passageway 91 can be readily selected to maintain such three to one ratio after the size and number of piston passageways 59 for a given shock absorber has been determined. It will furthermore be understood that the aforementioned three to one ratio applies only where the length or depth of the piston and base valve bodies are substantially the same, but the ratio may not apply if, for example, the piston were relatively thin and the base valve relatively heavy. In other words, the primary importance resides in the fact that the ratio between the sizes of the holes in the base valve and piston assembly, i. e. the length and diameter, must be such that three times as much fluid can flow through the piston than through the base valve where the area of the pressure chamber less the area of the operating rod and the area of the rod are in a three to one ratio. In certain instances this ratio may be decreased if the base valve disks are properly correlated with the piston assembly, as will hereinafter appear.

In the obtainance of the aforementioned results shown in Fig. 4, three .076" diameter holes or openings 59 were provided which were approximately 1/16" in length and one .076" diameter base valve hole or opening 91 was provided which was substantially 1/16" in length, thus establishing the desired three to one ratio referred to hereinbefore. The spring 71 and disk 67 which closed the upper ends of the piston openings 59 were extremely light and offered practically no resistance to the upward flow of fluid through the piston. The disk 67 was .015" thick and the spring steel star spring 71 was .012" thick. The maximum resistance offered by the disk and spring at a piston velocity of 3900" per minute was only about ten pounds. Three, .020" thick, disks 75' were used to close the lower end of the base valve opening or passage 91 and the lower end of the rivet 96 was spun to a pressure of 300 pounds against the inner periphery of the disks 75'. While the passages or openings were of the aforementioned sizes these passages will only provide the results illustrated in Fig. 4 with a fluid or liquid of a certain viscosity and where the diameter of the pressure cylinder is one inch and the diameter of the operating rod 17 is one-half inch. The liquid used in the test from which the results illustrated in Fig. 4 were obtained had a viscosity of 85–90 Saybolt seconds at 100° F. Of course, the hole diameters could be altered to vary the resistance curve when a liquid having the stated viscosity was employed and could be altered to obtain the same resistance if a fluid or liquid of a different viscosity were employed in the shock absorber. Likewise, these diameters may vary as the length of the passages is varied, so long as the same resistance to fluid flow is maintained thereby. Furthermore, for different size pressure cylinders the passage sizes would have to be changed in order to obtain the same resistance values as will be seen from the table hereinafter set forth.

Thus it will be appreciated that while the results shown in Fig. 4 were obtained with passages of the sizes heretofore mentioned, they could be obtained with various other passage sizes. Also, it should be distinctly understood that the results shown in Fig. 4 could be varied by varying the characteristics of the valve disks which close the passages. Still further, the curve illustrated in Fig. 4 and the resistance desired from the shock absorber will vary with different types of vehicle suspension systems on which the shock absorber is used, and with various types and weights of vehicles on which the shock absorber is mounted. The sizes of the piston and base valve passages and the resistance obtained are merely illustrative of one specific example of a shock absorber of this invention, and are not to be considered as limiting the invention to the example illustrated.

From tests that have been run it is indicated there is a critical relationship for predetermined passage length, between the area of the piston compression passages 59 and the area of the pressure cylinder less the area of the operating rod, i. e., the rebound chamber of the pressure cylinder. For example, in a shock absorber having a one inch bore or pressure cylinder the area of the pressure cylinder is .7854 square inch, and if a one-half inch diameter operating rod is used the area of the operating rod is .196 square inch, so that the area of the rebound chamber is the difference, or .589 square inch. The piston has three compression passages each .076" in diameter, and each having an area of .00455 square inch. The area of the three holes is, therefore, three times .00455 square inch, or .01365 square inch, which when divided by .589 square inch is approximately 2.3% of the area of the rebound chamber. Tests indicate that if the total cross-sectional area of the piston compression passages, for this size shock absorber, where the length of the passages is approximately $\frac{1}{16}$ of an inch, is less than .0024 square inch or .4% of the area of the rebound chamber, the results of this invention cannot be satisfactorily achieved because relatively free flow of fluid at low velocities is no longer present. Likewise, it appears that if the total cross-sectional area of the piston compression passages exceeds .020 square inch, or 5% of the area of the rebound chamber, the results of this invention will not be properly achieved because the desired orifice effect at high velocities is not obtained. Thus it appears that the area of a piston compression passage or passages should be between .4% and 5% of the area of the shock absorber rebound chamber. Of course, if the length of the passages were increased materially, the diameter of the passages could likewise be increased and the same resistance values obtained. Such increases are considered to be within the scope of this invention when the same general type of results are achieved. The same is true when a liquid of a different viscosity from that mentioned above is used. It will thus be seen that there is a critical relationship between the area of the piston compression passages relative to the area of the shock absorber rebound chamber, if the length of the passages does not vary and if fluid of a generally normal and conventional viscosity is employed.

In order to show the relationship between the area of the piston passages and the shock absorber size, rebound chamber area, and operating rod area, the following table is presented. This table denotes piston passage sizes which are illustrative only, but the area of which is determined to produce a given percentage of area relative to the shock absorber rebound chamber area, in accordance with the critical range referred to above. This table furthermore presents the aforementioned data only for ⅞", 1", 1⅜" and 2" pressure cylinder diameter shock absorbers, and of course, the invention is not limited to these exact sizes. Therefore, this table presents the data for the various sized shock absorbers to indicate the relationship between the various areas to obtain the percentage of .4% and the percentage of 5% between the piston passages and the rebound chamber areas, and in addition, for a one inch shock absorber, to show this relationship for the shock absorber from which the results shown in Fig. 4 were obtained, and in which the area of the piston compression passages was 2.3% of the area of the rebound chamber. Furthermore, the length of the passages for the different sized shock absorbers was in the vicinity of $\frac{1}{16}$" and did not vary enough to affect the data presented.

| Pressure Cylinder Diameter | Operating Rod Diameter | Piston Passage Diameter | Number of Piston Passages | Pressure Cylinder Area | Operating Rod Area | Total Piston Passage Area | Percentage of Passage Area Relative to Rebound Chamber Area |
|---|---|---|---|---|---|---|---|
| C | D | P | | CA | DA | PA | $\% = \frac{PA}{CA-CA}$ |
| Inches | Inches | | | | | | % |
| ⅞ | ⁷⁄₁₆ | .048 | 1 | .6013 | .1503 | .0018 | .4 |
| ⅞ | ⁷⁄₁₆ | .076 | 5 | .6013 | .1503 | .0225 | 5 |
| 1 | ½ | .055 | 1 | .7854 | .196 | .0023 | .4 |
| 1 | ½ | .079 | 6 | .7854 | .196 | .02945 | 5 |
| 1 | ½ | .076 | 3 | .7874 | .196 | .01365 | 2.3 |
| 1⅜ | ⅝ | .0775 | 1 | 1.485 | .307 | .0047 | .4 |
| 1⅜ | ⅝ | .112 | 6 | 1.485 | .307 | .0589 | 5 |
| 2 | 1 | .109 | 1 | 3.1416 | .7854 | .0094 | .4 |
| 2 | 1 | .158 | 6 | 3.1416 | .7854 | .1178 | 5 |

The shock absorber illustrated in Figures 5 through 8 is substantially the same as the shock absorber previously described, with the exception of the compression passageway construction in the piston, and therefore like parts of this embodiment are designated by prime numbers corresponding to like part numbers of the previous embodiment. In the embodiment illustrated in Figs. 5 through 8, the outer set of piston compression passageways are formed by means of circumferentially spaced notches or recesses 109 around the outer periphery of the piston body 51'. The depth of the notches or recesses 109 is relatively small and is in the neighborhood of only a few thousandths, so that the total area provided by these recesses is at least three times as great as the area of the base valve compression passageway 91', in the same manner as previously described for passageways 59. The recesses 109 are separated by means of lands or peripheral portions 111 which engage the inner wall of the pressure cylinder 21, so as to maintain the piston in sliding contact with the inner wall and in a proper centered relationship with respect thereto. The upper ends of the recesses or passageways 109 are normally closed by means of an annular lip 113 of a rubber gasket or rim 115. The lip 113 normally engages the inner wall of the pressure cylinder 21' so as to prevent the flow of fluid from the upper portion of the pressure cylinder to the lower portion thereof. The rim 115 is held in engagement with the upper surface of the piston body 51' by means of a washerlike member 117, which is disposed between the shoulder at the upper end of the piston rod reduced portion 53 and the upper surface of the piston body 53'. The washer 117 is ported at 119 so as not to interfere with the flow of fluid downwardly through the piston rebound passageways 61'. Thus, on the compression stroke of the shock absorber fluid flows upwardly through the recesses 109 and moves the lip 113 of the rubber rim or gasket 115 away from the inner wall of the pressure cylinder to permit the flow of fluid to the upper portion of the pressure cylinder. The recesses 109 are so correlated with respect to the base valve compression passageway 91 that the upper portion of the pressure cylinder will always be filled in substantially the same manner as through the outer set of piston passageways 59 of the previous embodiment, so that the shock absorber of this embodiment operates and produces the same effect as the shock absorber previously described.

Figure 10:
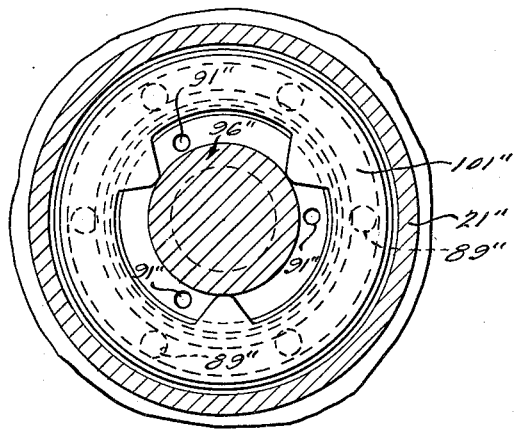
Fig. 10 is a sectional view of the structure illustrated in Fig. 9, taken along the line 10—10 thereof.
Figure 11:
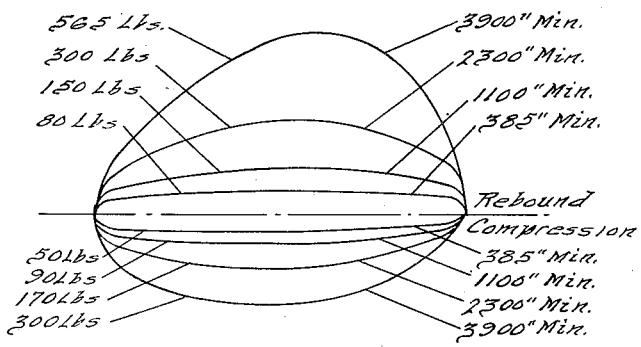
Fig. 11 is a graphic representation of the resistances provided by a shock absorber of the type illustrated in Fig. 9 at different piston velocities.

In the embodiment of the invention illustrated in Figs. 9 through 11 the shock absorber illustrated is identical to the one previously described, in connection with Figs. 1 to 3, except for the base valve, so that only the base valve and adjacent portions of the shock absorber are illustrated. In this embodiment the base valve is provided with three .089" diameter passages 91''' and the passages are, therefore, substantially unrestricted so that little or no orifice control will be obtained from these passages even at high piston velocities. Three disks 75''' are provided for closing the passages 91''', each of which is .020" in thickness and all of which are made of spring steel. In the particular shock absorber from which the results shown in Fig. 11 were obtained, the lower end of the rivet 96 was spun to a pressure of 375 pounds against the inner periphery of the disks. The piston was constructed in the same manner as previously described and had three .076 diameter compression passages so that a further description of the same will not be necessary.

Referring now to Fig. 11 it will be seen that with the shock absorber illustrated in Figs. 9 through 11 the piston assembly and base valve assembly together will offer a total of fifty pounds resistance to movement of the piston toward the base valve at a piston velocity of 385 inches per minute. At a velocity of 1100 inches per minute the resistance offered by the base valve assembly and the piston assembly together increased to ninety pounds, and at a velocity of 2300 inches per minute the total resistance increased to one hundred and seventy pounds. Further, at the high velocity of 3900 inches per minute the resistance increased to three hundred pounds. Therefore, it will be appreciated that even where the base valve passages are unrestricted, relatively high resistance will be obtained at high piston velocities and relatively low resistance at low piston velocities. This results from the fact that the piston compression passages are still restricted. It should be understood that even if both the piston and base valve compression passages were restricted, as described before, the piston passages would provide 75% of the total orifice control, so that even if the base valve compression passage is not restricted, or does not provide orifice control, the piston passages will still provide substantial orifice control to produce the results illustrated and desired within the scope of this invention. It should, however, be pointed out that the base valve disks 75''' must be constructed and/or preloaded such that the piston assembly will not develop internal shock absorber pressures at any piston velocities which are greater than the pressures produced by the base valve at the same speed. In other words, the resistance to fluid flow provided by the base valve disks must always be equal to or greater than the resistance to fluid flow provided by the piston passages and disks normally closing the same, together, in order to provide a shock absorber which will operate properly and so that the upper portion of the pressure cylinder, between the piston and operating rod guide, will fill and the shock absorber will not starve on the rebound stroke. The results shown in Fig. 11 are, of course, merely illustrative and will vary with fluids of different viscosities, different passage sizes, etc. Also, for different types of vehicle suspensions, control and vehicle weights, different results would be desired and obtained, but in all cases the base valve disks must be loaded in such a manner that they will provide as great or greater resistance to fluid flow than does the piston assembly. Furthermore, the piston compression passages 59 are still restricted and must be of a size between .4% and 5% of the pressure cylinder rebound area, or the area of the pressure cylinder less the area of the operating rod. With the use of a restricted piston excessively high internal pressures are avoided, so that aeration of the liquid will be reduced to a minimum and loss of resistance during operation due to piston wear and valve spring set is effectively minimized.

Thus the results of this invention may be obtained either with a piston having restricted compression passages and a base valve having restricted passages and pressure responsive valve disks, or with a restricted piston and a nonrestricted base valve having pressure responsive valve disks which will produce internal working pressures as high or higher than those produced by the piston assembly at any piston velocity during shock absorber operation. In some installations it has been found desirable to employ a shock absorber in which the base valve passage is unrestricted, even though all of the orifice or velocity responsive control must be provided by the piston passages, which, of course, reduces the efficiency of the velocity responsive control a certain amount as compared with the construction previously described, in which the passages of both the piston and base valve were restricted.

Thus it can be understood that if both the piston and base valve compression passages are restricted, the ratio between the sizes thereof is preferably in substantially the same proportion as the pressure cylinder area minus the rod area is to the operating rod area. This ratio can, however, be more or less than that proportion, but if the ratio is increased, or more than the proportion, the efficiency of the piston restriction or orifice control will decrease in substantially the same proportion, and if the ratio is decreased, or less than the proportion, the pressure responsive valve means or disks of the base valve must be adjusted in such a manner that the pressures produced by the base valve disks and any restriction in the base valve passage will always be equal to or greater than the pressures produced by the piston compression passage and disk at all piston velocities during the shock absorber operation. Therefore, again it must be emphasized that the results of this invention can be obtained with different balanced conditions of the pressure responsive and velocity responsive means in the shock absorber piston and base valve assemblies.

It has been found from actual road tests that when a vehicle is travelling on relatively smooth pavement the velocity of the piston will vary from about zero inches per minute up to around 500 or 600 inches per minute, while when a vehicle is driven on rough, irregular surfaces the velocity of the piston may reach 6,000 inches per minute, due primarily to the fact that on rough surfaces the length of the stroke of the piston is greatly increased and the piston may move at wheel frequency rather than at body frequency, the former of which is almost ten times the latter. However, for the purpose of this disclosure, the following values have been chosen as representing low and high velocity: Low velocity 385 inches per minute and high velocity 2300 inches per minute or more.

It will, therefore, be seen that with a shock absorber of this invention the valve disks or pressure responsive means will primarily control the flow or fluid through the piston and base valve when the vehicle is travelling on relatively smooth pavement, although a very small amount of resistance to the flow of fluid, even at relatively low velocities, is set up by the restricted passageways in the piston and base valve and by friction in the shock absorber. However, when the vehicle is travelling over irregular surfaces or rough roads, the resistance to the flow of fluid through the base valve and piston, or the piston alone, as the case may be, will be controlled both by the restricted passageways and the valve disks, and the majority of this resistance or control is provided by the restricted passageways. Furthermore, with the construction of this invention, the damping rate of the piston and base valve can be easily varied. That is, the resistance at relatively high piston velocities can be varied without materially affecting the resistance to fluid flow at relatively low velocities, and vice versa.

In order to increase the efficiency of the shock absorber on the compression stroke and consequently the unit as a whole, and permit the use of a shock absorber having a smaller pressure cylinder diameter, applicant has in effect put the piston to work during its compression stroke. In previous constructions, in order to insure proper filling of fluid above the piston during the compression stroke, exceedingly large passageways through the piston have been provided resulting in little restriction to the flow of fluid through the piston during the compression stroke. The pressure differential between the lower and upper side of the piston was substantially zero, resulting in substantially zero total work being done by the piston. By controlling the sizes of the passageways through the piston, a restriction to flow through said piston is set up during the compression stroke, which results in a pressure differential between the lower and upper sides of the piston. This pressure differential acts upon the full area of the piston, less the piston rod area, and thereby greatly increases the resistance of the shock absorber. The original pressure below the piston acts upon the piston rod area in the conventional manner, thus giving a substantial resistance increase directly attributable to the size controls placed upon the piston passageways. Since it is important that the chamber above the piston be loaded with fluid at all times so that the rebound stroke will occur normally with a minimum of lag, the pressure above the piston during the compression stroke must be something higher than atmospheric pressure. The piston and base valve are directly dependent upon each other in order to produce this relationship during the compression stroke. The total restriction provided by the piston must be substantially the same or less than the total resistance provided by the base valve assembly at all piston velocities which may occur on the vehicle. At any particular piston velocity or any particular presusre, if a volume of fluid equal to that of the piston rod flows through the base valve, a volume of fluid equal to or slightly greater than the volume encompassed by the same given length of the pressure cylinder, less the volume of the piston rod, must flow through the piston. It can be seen that by properly correlating the piston and base valve passageways and pressure responsive disks, this condition can be maintained at all speeds and more work done on the compression stroke of the shock absorbers.

It is therefore possible, with the construction of this invention, to obtain results which have not been heretofore obtained in shock absorber constructions and to provide a shock absorber in which the efficiency and control factors are materially increased without increasing the manufacturing cost, as well as a shock absorber in which the control factors may be easily varied to produce any desired control characteristics in accordance with the type of vehicle or other apparatus on which the shock absorber is mounted.

What is claimed is:

1. A hydraulic shock absorber including a pressure cylinder and a reserve chamber, both of which normally contain hydraulic fluid, means closing the opposite ends of said pressure cylinder, including a compression base valve body adjacent one end thereof, a piston slidably disposed in said pressure cylinder, an operating rod connected with said piston and extending through the closure means at the opposite end of said pressure cylinder from said compression base valve body, said piston having a passageway therethrough through which fluid may flow from the compression base valve side of said piston to the opposite side thereof during the compression stroke of said piston or movement thereof toward said base valve body, said piston having another passageway therethrough through which fluid may flow from the operating rod side of said piston to the opposite side thereof during the rebound stroke of said piston or movement thereof away from said base valve body, valve means normally closing each of said piston passageways and actuatable by a predetermined fluid pressure acting thereagainst to permit a flow of fluid from one side of said piston to the other side thereof, said base valve body having a compression passageway therethrough through which fluid displaced by said operating rod may flow from said pressure cylinder to said reserve chamber during the compression stroke of said piston, valve means normally closing said base valve body passageway against the flow of fluid therethrough and actuatable by a predetermined fluid pressure to permit fluid to flow through said passageway; said piston compression passageway valve means being actuatable by a lesser fluid pressure than said compression base valve body means, means permitting fluid to flow past said base valve body from said reserve chamber to said pressure cylinder on the rebound stroke of said piston so as to replenish said pressure cylinder, the sizes of the piston compression passageway and the base valve compression passageway being of a ratio substantially equal to the ratio between the pressure cylinder area less the operating rod area and the operating rod area, whereby when said piston moves toward said base valve body the necessary volume of fluid will flow through said piston compression passageway to keep the portion of the pressure cylinder on the operating rod side of said piston continually filled with fluid, and said passageways also being of such a size that at relatively low piston velocities the valve means of said compression valve body passageway and said piston compression passageway will primarily control flow of fluid through said piston and valve body and at relatively high piston velocities said compression valve body passageway and said piston compression passageway will provide the majority of control to the flow of fluid through said piston and valve body.

2. A hydraulic shock absorber including a pressure cylinder and a reserve chamber, both of which normally contain hydraulic fluid, means closing the opposite ends of said pressure cylinder including a compression base valve body adjacent one end thereof, a piston slidably disposed in said pressure cylinder, an operating rod connected with said piston and extending through the closure means at the opposite end of said pressure cylinder from said compression base valve body, said piston having a passageway therethrough through which fluid may flow from the compression base valve side of said piston to the opposite side thereof during the compression stroke of said piston assembly or movement thereof toward said base valve assembly, means permitting a flow of fluid past said piston from the operating rod side of said piston to the opposite side thereof during the rebound stroke of said piston or movement thereof away from said base valve body, valve means normally closing said piston compression passageway and actuatable by a predetermined fluid pressure acting thereagainst to permit a flow of fluid from the one side of said piston to the other side thereof, said base valve body having a compression passageway therethrough through which fluid displaced by said operating rod may flow from said pressure cylinder to said reserve chamber during the compression stroke of said piston, valve means normally closing said base valve body passageway against the flow of fluid therethrough and actuatable by a predetermined fluid pressure to permit fluid to flow through said passageway, said piston compression passageway valve means being actuatable by a lesser fluid pressure than said compression base valve body valve means, means permitting fluid to flow past said base valve body from said reserve chamber to said pressure cylinder on the rebound stroke of said piston so as to replenish said pressure cylinder, the sizes of the piston compression passageway and the base valve compression passageway being of a ratio substantially equal to the ratio between the pressure cylinder area less the operating rod area and the operating rod area, whereby when said piston moves toward said base valve body the necessary volume of fluid will flow through said piston compression passageway to keep the portion of the pressure cylinder on the operating rod side of said piston continually filled with fluid, and said passageways also being of such a size that at relatively low piston velocities the valve means of said compression valve body passageway and said piston compression passageway will primarily control flow of fluid through said piston and valve body and at relatively high piston velocities said compression valve body passageway and said piston compression passageway will provide the majority of control to the flow of fluid through said piston and valve body.

3. A hydraulic shock absorber including a pressure cylinder and a reserve chamber, both of which normally contain hydraulic fluid, means closing the opposite ends of said pressure cylinder including a base compression valve body adjacent one end of said pressure cylinder, a piston slidably disposed in said pressure cylinder, an operating rod connected with said piston and extending through the closure means at the opposite end of said pressure cylinder from said compression valve body, passageway means in said piston for permitting a flow of fluid from the compression valve body side of said pressure cylinder to the opposite side thereof during the compression stroke of said piston or movement thereof toward said base compression valve body, the area of said piston passage means being not less than .4% nor more than 5% of the area of the pressure cylinder less the area of said operating rod, means permitting a flow of fluid past said piston from the operating rod side of said piston to the opposite side of said pressure cylinder during the rebound stroke of said piston or movement thereof away from said base compression valve body, fluid passageway means in said base compression valve body permitting a flow of fluid displaced by said operating rod from said pressure cylinder to said reserve chamber during the compression stroke of said piston, means permitting a flow of fluid past said compression valve body from said reserve chamber to said pressure cylinder during the rebound stroke of said piston, the sizes of the piston compression passageway means and the base valve compression passageway means being of a ratio substantially equal to the ratio between the pressure cylinder area less the operating rod area and the operating rod area, whereby when said piston moves toward said compression valve body the necessary volume of fluid will flow through said piston compression passageway means so as to insure that the operating rod side of said pressure cylinder will be continually filled with fluid at all times, said compression passageway means of said piston and valve body also being of such a size as to permit a relatively free flow of fluid past the piston and valve body at relatively low piston velocities, and increasingly higher restriction to the flow of fluid from one side to the other of said piston and valve body at relatively high piston and fluid velocities, and said piston compression passageway means being such that at relatively high piston velocities the fluid pressure differential, between opposite sides of said piston, acts upon substantially the full area of said piston, less the area of said operating rod.

4. In a hydraulic shock absorber, a pressure cylinder and a reserve chamber, both of which normally contain hydraulic fluid, means closing the opposite ends of said pressure cylinder including a valve body adjacent one end thereof, a piston operable in said cylinder and adapted upon movement in said cylinder toward said valve body to pass fluid from the side of the pressure cylinder adjacent said valve body to the other side of said piston, an operating rod connected with said piston and extending through the closure means at the opposite end of said pressure cylinder from said valve body, pressure responsive means for controlling the flow of fluid from the one side of said piston to the other side, means responsive to the velocity of said piston in said cylinder for controlling the flow of fluid from the one side of said piston to the other side in accordance with the velocity of said piston, said valve body being adapted upon said movement of said piston to pass fluid from said pressure cylinder to said reserve chamber, pressure responsive means for controlling the flow of fluid from said pressure cylinder to said reserve chamber, means responsive to the velocity of said piston in said cylinder for controlling the flow of fluid from said pressure cylinder to said reserve chamber in accordance with the velocity of the piston, said piston pressure and velocity responsive means and said valve body pressure and velocity responsive means being so constructed that the ratio between the flow of fluid past said piston from the said one side thereof to the other side thereof and the flow of fluid past the valve body from said pressure cylinder to said reserve chamber is substantially equal to the ratio between the pressure cylinder area less the operating rod area and the operating rod area, whereby when the piston moves toward said valve body the necessary volume of fluid will flow past said piston to keep the portion of the pressure cylinder on the operating rod side of said piston continually filled with fluid, and said pressure responsive means and velocity responsive means also being so related that said pressure reponsive means will provide the majority of the control of the flow of fluid from the one side of said piston to the other side and from the pressure cylinder to the reserve chamber during low piston velocities, and the combination of said piston and valve body velocity responsive means will provide the majority of the control of the flow of fluid from the one side of said piston to the other side thereof and from the pressure cylinder to the reserve chamber during relatively high piston velocities.

5. In a hydraulic shock absorber, a pressure cylinder and a reserve chamber, both of which normally contain hydraulic fluid, means closing the opposite ends of said pressure cylinder including a valve body adjacent one end thereof, a piston slidably disposed in said pressure cylinder, an operating rod connected with said piston and extending through the closure means at the opposite end of said pressure cylinder from said valve body, said piston having a passageway through which fluid may flow from the valve body side of said piston to the opposite side thereof during the compression stroke of said piston or movement thereof toward said valve body, the area of said piston passage means being not less than .4% nor more than 5% of the area of the pressure cylinder less the area of said operating rod, said valve body having a passageway through which fluid displaced by said operating rod may flow from said pressure cylinder to said reserve chamber during the compression stroke of said piston, the sizes of the piston passageway and the valve body passageway being of a ratio substantially equal to the ratio between the pressure cylinder area less the operating rod area and the operating rod area, whereby when said piston moves toward said valve body the necessary volume of fluid will flow through said piston passageway to keep the portion of the pressure cylinder on the operating rod side of said piston continually filled with fluid, and the sizes of said passageways also being such that at high piston velocity said passageways will provide resistance to fluid flow therethrough which will provide a substantial portion of the total resistance to said piston movement.

6. A hydraulic shock absorber comprising a pressure cylinder normally filled with liquid, means serving as a liquid reservoir for said pressure cylinder, closure means closing one end of said pressure cylinder, a base valve assembly adjacent the opposite end of said pressure cylinder for controlling the flow of liquid from said pressure cylinder to said reservoir, a piston reciprocable in said pressure cylinder, an operating rod connected with said piston and extending through said closure means, said piston having a passage extending therethrough to permit the flow of liquid from the side of the pressure cylinder adjacent the base valve assembly to the opposite side of said pressure cylinder, said piston passage having an area of not less than .4% nor more than 5% of the area of said pressure cylinder less the area of said operating rod, said valve assembly including a body having a passage extending therethrough to permit a flow of liquid from said pressure cylinder to said reservoir, pressure responsive valve means for controlling the flow of liquid through said base valve body passage, said valve means being automatically actuatable to an open position by a predetermined liquid pressure to permit fluid to flow from said pressure cylinder to said reservoir, said base valve assembly providing resistance to the flow of liquid from said pressure cylinder to said reservoir which is substantially equal to but not less than the resistance to liquid flow provided by said piston at all operating piston velocities of the shock absorber.

7. A hydraulic shock absorber comprising a pressure cylinder normally filled with liquid, means serving as a liquid reservoir for said pressure cylinder and closure means closing one end of said pressure cylinder, a valve assembly adjacent the opposite end of said pressure cylinder controlling the flow of liquid from said pressure cylinder to said reservoir, a piston reciprocable in said pressure cylinder, an operating rod connected with said piston and extending through said closure means, said piston having a passage extending therethrough to permit liquid to flow from the portion of said pressure cylinder between said piston and valve assembly to the portion of said pressure cylinder on the opposite side of said piston, pressure responsive valve means controlling the flow of liquid through said piston passage and being actuatable to open position in response to a predetermined pressure of liquid in said passage, the area of said passage being not less than .4% nor more than 5% of the area of said pressure cylinder less the area of said operating rod, said valve assembly including a body having a passage extending therethrough to permit a flow of liquid from said pressure cylinder to said reservoir, pressure responsive valve means for controlling the flow of liquid through said valve passage and being automatically actuatable to open position in response to a predetermined pressure of liquid in said passage, said valve assembly passage and said valve assembly pressure responsive valve means providing resistance to the flow of liquid from the pressure cylinder to the reservoir which is substantially equal to but not less than the resistance to liquid flow provided by the piston passage and valve means to the flow of liquid past said piston at all operating piston velocities.

8. A hydraulic shock absorber comprising a pressure cylinder normally filled with liquid, means serving as a liquid reservoir for said pressure cylinder, closure means closing one end of said pressure cylinder, a valve assembly adjacent the opposite end of said pressure cylinder for controlling the flow of liquid from the pressure cylinder to the reservoir, a piston reciprocable in said pressure cylinder, an operating rod connected with said piston and extending through said closure means, said piston having passage means extending therethrough to permit liquid to flow from the portion of said pressure cylinder between said piston and valve assembly to the portion of said pressure cylinder on the opposite side of said piston, the area of said piston passage means being not less than .4% nor more than 5% of the area of said pressure cylinder less the area of said operating rod, said valve assembly including a body having a passage extending therethrough, valve disk means normally engaging one face of said body so as to close one end of said passage against the flow of liquid therethrough, means supporting said valve disk means in engagement with said valve body face so that said disk means is automatically actuatable to open position in response to a predetermined liquid pressure in said valve body passage, said valve assembly providing a greater resistance to the flow of liquid therepast than said piston at any given operating piston velocity.

9. A hydraulic shock absorber including a pressure cylinder normally filled with liquid, means serving as a liquid reservoir for said pressure cylinder, closure means closing one end of said pressure cylinder, a valve body adjacent the opposite end of said pressure cylinder permitting the flow of liquid from said pressure cylinder to said reservoir, a piston reciprocable in said pressure cylinder, an operating rod connected with said piston and extending through said closure means, said piston having passage means extending therethrough to permit a flow of liquid from the portion of said pressure cylinder between said piston and said valve body to the portion of said pressure cylinder on the opposite side of said piston during movement of said piston toward said valve body, said valve body having a passage therethrough through which liquid displaced by said operating rod may flow from said pressure cylinder to said reservoir during the compression stroke of said piston, said valve body passage having a flow capacity allowing a relatively free flow of liquid therethrough at low piston velocities, pressure responsive valve means for controlling the flow of liquid through said valve body passage, said valve means being automatically actuatable to open position in response to a predetermined pressure of liquid in said valve body passage, the ratio of the sizes of the piston compression passage and base valve compression passage being substantially equal to but not less than the ratio between the pressure cylinder area minus the operating rod area and the operating rod area, whereby when said piston moves toward said base valve body the necessary volume of liquid will flow through said piston compression passage to keep the portion of the pressure cylinder on the operating rod side of the piston continually filled with liquid, and the area of said piston passage means being not less than .4% nor more than 5% of the area of said pressure cylinder less the area of said operating rod.

10. A hydraulic shock absorber, including a pressure cylinder normally filled with liquid, means serving as a liquid reservoir for said pressure cylinder, closure means closing one end of said pressure cylinder, a valve body adjacent the opposite end of said pressure cylinder permitting a flow of liquid from said pressure cylinder to said reservoir, a piston reciprocable in said pressure cylinder, an operating rod connected with said piston and extending through said closure means, said piston having passage means extending therethrough to permit a flow of liquid from the portion of said pressure cylinder between said piston and valve body to the portion of said pressure cylinder on the opposite side of said piston during movement of said piston toward said valve body, pressure responsive valve means normally closing said piston passage against the flow of liquid therethrough and actuatable to open position in response to a predetermined pressure of liquid in said passage means corresponding to low piston velocity, said valve body having passage means extending therethrough through which liquid displaced by said operating rod may flow from said pressure cylinder to said reservoir during the compression stroke of said piston, said valve body passage having a flow capacity allowing a relatively free flow of liquid therethrough at low piston velocities, pressure responsive valve means for controlling the flow of liquid through said valve body passage means, said valve means being automatically actuatable to open position in response to a predetermined pressure of liquid in said valve body passage means, which predetermined pressure is greater than the predetermined pressure for actuating said piston pressure responsive valve means, the ratio of the sizes of said piston compression passage means and base valve compression passage means being substantially equal to but not less than the ratio between the pressure cylinder area minus the operating rod area and the operating rod area, whereby when said piston moves toward said base valve body the necessary volume of liquid will flow through said piston compression passage means to keep the portion of the pressure cylinder on the operating rod side of the piston continually filled with liquid, and the area of said piston passage means being not less than .4% nor more than 5% of the area of said pressure cylinder less the area of said operating rod.

11. A hydraulic shock absorber comprising a pressure cylinder normally filled with liquid, means serving as a liquid reservoir for said pressure cylinder, closure means closing one end of said pressure cylinder, a base valve assembly adjacent the opposite end of said pressure cylinder for controlling the flow of liquid from said pressure cylinder to said reservoir, a piston reciprocable in said pressure cylinder, an operating rod connected with said piston and extending through said closure means, said piston having a passage extending therethrough to permit the flow of liquid from the side of said pressure cylinder adjacent the base valve assembly to the opposite side of said pressure cylinder, said piston passage having an area of not less than .4% nor more than 5% of the area of said pressure cylinder less the area of said operating rod, said valve assembly including a body having a passage of predetermined size extending therethrough to permit a flow of liquid from said pressure cylinder to said reservoir, said passage size being such as to permit a relatively free flow of fluid therethrough at all operating piston velocities, pressure responsive valve means for controlling the flow of liquid through said base valve body passage, said valve means being automatically actuatable to an open position by a predetermined liquid pressure to permit liquid to flow from said pressure cylinder to said reservoir, said base valve assembly providing resistance to the flow of liquid from said pressure cylinder to said reservoir which is substantially equal to but not less than the resistance to liquid flow provided by said piston at all operating piston velocities of the shock absorber.

12. A hydraulic shock absorber as defined in claim 3, in which the pressure cylinder area loss the operating rod area is substantially in the ratio of three to one to the operating rod area, and the ratio of the flow capacity of the piston compression passageway means to the flow capacity of the base valve compression passageway means also being substantially three to one.

13. A hydraulic shock absorber comprising a pressure cylinder normally filled with liquid, means serving as a liquid reservoir for said pressure cylinder and closure means closing one end of said pressure cylinder, a valve assembly adjacent the opposite end of said pressure cylinder controlling the flow of liquid from said pressure cylinder to said reservoir, a piston reciprocable in said pressure cylinder, an operating rod connected with said piston and extending through said closure means, said piston having a passage extending therethrough to permit liquid to flow from the portion of said pressure cylinder between said piston and valve assembly to the portion of said pressure cylinder on the opposite side of said piston, pressure responsive valve means controlling the flow of liquid through said piston passage and being actuatable to open position in response to a predetermined pressure of liquid in said passage, the area of said passage being substantially 2.3% of the area of said pressure cylinder less the area of said operating rod, said valve assembly including a body having a passage extending therethrough to permit a flow of liquid from said pressure cylinder to said reservoir, pressure responsive valve means for controlling the flow of liquid through said valve passage and being automatically actuatable to open position in response to a predetermined pressure of liquid in said passage, said valve assembly passage and said valve assembly pressure responsive valve means providing resistance to the flow of liquid from the pressure cylinder to the reservoir which is substantially equal to but not less than the resistance to liquid flow provided by the piston passage and valve means to the flow of liquid past said piston at all operating piston velocities.

RALPH H. WHISLER, Jr.

REFERENCES CITED

The following references are of record in the file of this patent:

UNITED STATES PATENTS

| Number | Name | Date |
|---|---|---|
| 2,107,974 | Bechereau et al. | Feb. 8, 1938 |
| 2,335,907 | Boor et al. | Dec. 7, 1943 |